Figures 1, 2:
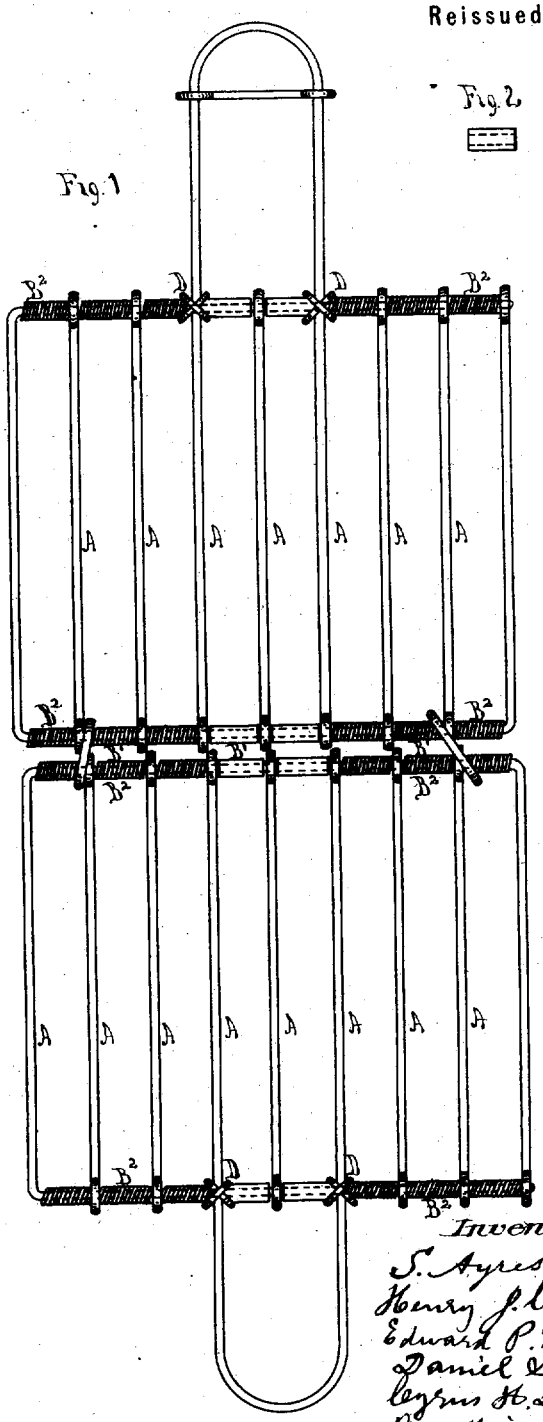

S. AYRES & H. J. CHAMBERLIN.

Wire Toaster or Broiler.

No. 6,371. Reissued April 13, 1875.

Witnesses
M. M. Tidd
Wm. O. Brown

Inventors:
S. Ayres
Henry J. Chamberlin
Edward P. Woods
Daniel Sherwood
Lyman H. Latham
By their Attorney
John E. Lerdue

A5595.

THE GRAPHIC CO. PHOTO-LITH. 39 & 41 PARK PLACE, N.Y.

UNITED STATES PATENT OFFICE.

SAMUEL AYRES AND HENRY J. CHAMBERLIN, OF WORCESTER, ASSIGNORS, BY MESNE ASSIGNMENTS, TO EDWARD P. WOODS, DANIEL SHERWOOD, AND CYRUS H. LATHAM, OF LOWELL, MASSACHUSETTS.

IMPROVEMENT IN WIRE TOASTERS OR BROILERS.

Specification forming part of Letters Patent No. 44,590, dated October 11, 1864; reissue No. 6,371, dated April 13, 1875; application filed March 31, 1875.

*To all whom it may concern:*

Be it known that SAMUEL AYRES and HENRY J. CHAMBERLIN, of the city and county of Worcester, and State of Massachusetts, have invented certain new and useful Improvements in Broilers or Toasters; and we, the said CHAMBERLIN and EDWARD P. WOODS, DANIEL SHERWOOD, and CYRUS H. LATHAM, company firm of WOODS, SHERWOOD & Co., do hereby declare the following to be a full, clear, and exact description of the same, due reference being had to the accompanying drawings.

The object of our invention is to provide means for the better securing of the bars A in their places by depressions or slots constructed on the frame ends $B^2$; and its nature consists of the frame ends having shouldered notches or slots, in which the bars of the broiler are clamped around its ends, whereby said notches or slots are effectual in retaining said bars A in their places.

Figure 1 shows an open broiler of our improved construction.

$B^2$ are the ends of the broiler, which are formed of an internal wire or rod, and having collars or ferrules surrounding them, so that the ends of the ferrules do not quite meet, and form notches between them. The bars A are turned at their ends around the frame ends $B^2$ in the notches, thereby holding the bars A in their places. These bars A, or like or similar bars, have heretofore been held in place or position by binding or lacing wire around and between them, which soon rusts off, particularly at $B^1$, and across that end of the broiler where most exposed to the fire. At D D, where the bars extend to form the handles, a notch is made in the frame to seat the bar, which is bound to place; or, if thought best to carry them around before extending, then the binding may be dispensed with.

We claim—

The broiler ends $B^2$, having shouldered depressions, with which the bars A are combined, and secured in position, substantially as described.

HENRY J. CHAMBERLIN.
EDWARD P. WOODS.
DANIEL SHERWOOD.
CYRUS H. LATHAM.

Witnesses:
STANLEY MANSFIELD,
MARTIN L. HAMBLET.